United States Patent
Cho et al.

(10) Patent No.: US 9,749,690 B2
(45) Date of Patent: Aug. 29, 2017

(54) SYSTEM FOR COLLECTING METADATA OF A VIDEO DATA IN A VIDEO DATA PROVIDING SYSTEM AND METHOD THEREOF

(71) Applicant: Hanwha Techwin Co., Ltd., Changwon-si (KR)

(72) Inventors: Sungbong Cho, Changwon-si (KR); Chanki Jeon, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/920,996

(22) Filed: Oct. 23, 2015

(65) Prior Publication Data
US 2016/0127782 A1     May 5, 2016

(30) Foreign Application Priority Data
Nov. 4, 2014    (KR) .................. 10-2014-0152079

(51) Int. Cl.
*H04N 21/4627*      (2011.01)
*H04N 21/6334*      (2011.01)
(Continued)

(52) U.S. Cl.
CPC ......... *H04N 21/4627* (2013.01); *G06F 21/30* (2013.01); *G06F 21/32* (2013.01);
(Continued)

(58) Field of Classification Search
CPC ........... H04N 21/4627; H04N 21/6334; H04N 21/4753; H04N 21/2541; H04N 21/4415; H04N 21/44204; H04N 21/4316; H04N 21/858; H04N 21/4532; H04N 21/475; H04L 63/10; H04L 9/3226; H04L 9/3271; H04L 29/06809; H04L 63/0861; H04L 9/0866; H04L 9/3231; H04L 63/101;
(Continued)

(56) References Cited

U.S. PATENT DOCUMENTS

| 8,140,847 | B1 * | 3/2012 | Wu | ...................... G06F 21/6218 |
| | | | | 713/175 |
| 8,646,060 | B1 * | 2/2014 | Ben Ayed | ........... H04L 63/0853 |
| | | | | 726/9 |

(Continued)

FOREIGN PATENT DOCUMENTS

| JP | 2006163825 A | 6/2006 |
| JP | 2008306531 A | 12/2008 |

(Continued)

*Primary Examiner* — Hoang-Vu A Nguyen-Ba
(74) *Attorney, Agent, or Firm* — Sughrue Mion, PLLC

(57) ABSTRACT

Provided are a video information system and a method of providing video data access history. Biomedical information or non-biomedical information that may authorize a user who is accessing video data stored in the video information system is stored to be linked to the video data as metadata of the video data, and thus, an authorized user who later accesses the video information system may identify an identity of a user who has accessed the video data. If it is determined that the user is an unauthorized user, the biomedical information or the non-biomedical information of the user may be used to determine who the unauthorized user is.

12 Claims, 9 Drawing Sheets

(51) Int. Cl.

| | |
|---|---|
| *H04N 21/475* | (2011.01) |
| *H04N 21/254* | (2011.01) |
| *H04N 21/4415* | (2011.01) |
| *H04N 21/442* | (2011.01) |
| *H04N 21/45* | (2011.01) |
| *H04L 29/06* | (2006.01) |
| *H04L 9/32* | (2006.01) |
| *H04L 9/08* | (2006.01) |
| *G06F 21/62* | (2013.01) |
| *G06F 21/30* | (2013.01) |
| *G06F 21/33* | (2013.01) |
| *G06F 21/32* | (2013.01) |
| *H04N 21/431* | (2011.01) |
| *H04N 21/858* | (2011.01) |

(52) U.S. Cl.
CPC .............. *G06F 21/33* (2013.01); *G06F 21/62* (2013.01); *H04L 9/0866* (2013.01); *H04L 9/3226* (2013.01); *H04L 9/3231* (2013.01); *H04L 9/3271* (2013.01); *H04L 29/06809* (2013.01); *H04L 63/0861* (2013.01); *H04L 63/10* (2013.01); *H04L 63/101* (2013.01); *H04N 21/2541* (2013.01); *H04N 21/4415* (2013.01); *H04N 21/44204* (2013.01); *H04N 21/4532* (2013.01); *H04N 21/475* (2013.01); *H04N 21/4753* (2013.01); *H04N 21/6334* (2013.01); *H04N 21/4316* (2013.01); *H04N 21/858* (2013.01)

(58) Field of Classification Search
CPC .......... G06F 21/62; G06F 21/30; G06F 21/33; G06F 21/32
See application file for complete search history.

(56) References Cited

U.S. PATENT DOCUMENTS

| | | | | |
|---|---|---|---|---|
| 8,978,122 | B1* | 3/2015 | Zolfonoon | H04L 63/0815 726/4 |
| 9,032,498 | B1* | 5/2015 | Ben Ayed | G06F 21/35 726/9 |
| 9,237,146 | B1* | 1/2016 | Casillas | H04L 63/08 |
| 2004/0250272 | A1* | 12/2004 | Durden | H04N 7/163 725/25 |
| 2010/0306858 | A1* | 12/2010 | McLaren | G06F 19/322 726/28 |
| 2013/0036462 | A1* | 2/2013 | Krishnamurthi | G06F 21/32 726/19 |
| 2013/0152005 | A1* | 6/2013 | McLaren | G06F 19/322 715/771 |
| 2013/0198521 | A1* | 8/2013 | Wu | G06F 21/6209 713/175 |
| 2015/0288668 | A1* | 10/2015 | Kupper | H04L 63/08 726/4 |
| 2016/0005133 | A1* | 1/2016 | Flynn | G06Q 50/01 705/319 |
| 2016/0050209 | A1* | 2/2016 | Govande | H04L 63/083 726/7 |

FOREIGN PATENT DOCUMENTS

| | | |
|---|---|---|
| KR | 20020036143 A | 5/2002 |
| KR | 20030038933 A | 5/2003 |
| KR | 1020140054172 A | 5/2014 |

* cited by examiner

COMBINED VIDEO
DATA PROVIDING SYSTEM

ID :
PASSWORD :

LOG-IN

SYSTEM FOR COLLECTING METADATA OF A VIDEO DATA IN A VIDEO DATA PROVIDING SYSTEM AND METHOD THEREOF

CROSS-REFERENCE TO THE RELATED APPLICATION

This application claims priority from Korean Patent Application No. 10-2014-0152079, filed on Nov. 4, 2014, in the Korean Intellectual Property Office, the disclosure of which is incorporated herein in its entirety by reference.

BACKGROUND

1. Field

Apparatuses and methods consistent with exemplary embodiments relate to a video information system which is capable of recording a previous user's operations on video data stored in the video information system as metadata of the video data, and providing video data access history to a next user who accesses the video information system.

2. Description of the Related Art

The related art video information storage and playing apparatus in communication with a network camera does not impose any limitation to a user in performing operations about video data stored therein within an authority determined when a valid identification (ID) is generated, once the user has successfully accessed the apparatus by inputting the valid ID and a password to the apparatus.

However, there is no guarantee that only a rightful user who is granted the ID and the password inputs the ID and the password to the video information storage and playing apparatus. Thus, it is difficult to identify who has accessed the video information storage and playing apparatus and performed operations about the video data stored therein.

In particular, as a home closed-circuit television (CCTV), by which the inside of a house may be monitored in real-time by using a mobile device such as a smart phone, has been widely distributed, video data may be stored in a cloud server, and accordingly, a user who has illegally obtained the ID and the password to access the video information storage and playing apparatus may log in to the cloud server via an external network to play or download the video data stored in the cloud server. Therefore, a video information system capable of recognizing information about an unauthorized user and preventing an accident regarding the security of the video information system is required.

SUMMARY

Exemplary embodiments of the inventive concept provide a video information system and a method of providing video data access history, capable of storing user information input right before accessing video data as metadata of the video data so that a user who logs in to the video information system next time may identify whether a previous user is an authorized user for accessing the video information system.

Various aspects will be set forth in part in the description which follows and, in part, will be apparent from the description, or may be learned by practice of the presented embodiments.

According to one or more exemplary embodiments, there is provided a video information system for providing video data access history. The video information system may include: at least one memory configured to store a computer executable instructions; and at least one processor configured to execute the computer executable instructions to implement at least one module including: a metadata receiver requesting a user, who is attempting to access video data stored in a video data storage, to input metadata including at least one of biomedical information and non-biomedical information of the user, according to a level of significance of the video data, receiving the metadata input by the user, and storing the received metadata with a link to the video data in a metadata storage.

The at least one module may further include a user authenticator requesting the user to input at least a portion of user information to log in the video information system before the metadata receiver requests the user to input the metadata. The user information may include fixed information including an identification (ID) and a password of the user, and a plurality of pieces of unfixed information set by the user in advance. Here, the at least a portion of the user information may include the fixed information and at least one of the plurality of pieces of the unfixed information.

The user authenticator may generate a plurality of combinations of inquiries corresponding to the plurality of pieces of the unfixed information, respectively, each combination of the inquiries including at least one inquiry. When the user attempts to log in the video information system, the user authenticator may request the user to input the at least one of the plurality of pieces of the unfixed information in response to at least one of the plurality of combinations of the inquiries which the user authenticator randomly selects from the plurality of combinations of the inquiries.

The user authenticator may generate different inquiries or different combinations of the inquires in response to different inputs of the same user ID and password by the user.

The video information system may further include a metadata displayer configured to display the metadata with the video data, in response to a next user accessing the video data.

The metadata displayer may display the metadata only when a section of the video data that has been accessed by the user is played, and may not display the metadata when the remaining section of the video data that has not been accessed by the user is displayed.

If there are a plurality of users who have accessed the video data, the metadata displayer may display one or more pieces of metadata stored by the plurality of users according to a setting of the next user.

When the next user plays one piece of the video data that has been accessed by the user, the metadata displayer may display the metadata in a picture-in-picture (PIP) format on a screen playing the video data.

The at least one module of the video information system may further include: a log generator configured to generate a log, in which a list of video data that has been accessed by the user; and a log output unit configured to output the log to the next user.

When the next user plays one piece of the video data that has been played by the user, the metadata displayer may display one of the biomedical information and the non-biomedical information of the user during a play section of the video data based on the generated log and the metadata.

According to one or more exemplary embodiments, there is a method of providing video data access history using at least one processor. The method may include: controlling the processor to request a user, who is attempting to access video data stored in a video data storage, to input metadata including at least one of biomedical information and non-biomedical information of the user, according to a level of significance of the video data; controlling the processor to receive the metadata input by the user; and controlling the processor to store the received metadata with a link to the video data in a metadata storage.

The method may further include controlling the processor to request the user to input user information to log in the video information system, before the user is requested to input the metadata. The user information may include fixed information including an ID and a password of the user, and a plurality of pieces of unfixed information set by the user in advance, and the at least a portion of the user information may include the fixed information and at least one of the plurality of pieces of unfixed information.

The method may further include: controlling the processor to generate a plurality of combinations of inquiries corresponding to the plurality of pieces of the unfixed information, respectively, each combination of the inquiries including at least one inquiry; and controlling the processor, when the user attempts to log in the video information system, to request the user to input the at least one of the plurality of pieces of the unfixed information in response to at least one of the plurality of combinations of the inquiries that the user authenticator randomly selects from the plurality of combinations of the inquiries.

The method further include controlling the processor to generate different inquiries or different combinations of the inquires in response to different inputs of the same user ID and password by the user.

The method may further include controlling the processor to display the metadata with the video data, in response to a next user accessing the video data.

The displaying the metadata may include displaying the metadata only when a section of the video data that has been accessed by the user is played, and not displaying the metadata when the remaining section of the video data that has not been accessed by the user is displayed.

If there are a plurality of users who have accessed the video data, the displaying the metadata may include displaying one or more pieces of metadata stored by the plurality of users according to a setting of the next user.

The displaying the metadata may include, if the next user plays one piece of the video data that has been accessed by the user, displaying the metadata in a picture-in-picture (PIP) format on a screen playing the video data.

The method may further include: generating a log in which a list of video data that has been accessed by the user; and outputting the log to the next user.

The displaying the metadata may include, when the next user plays one piece of the video data that has been played by the user, displaying one of the biomedical information and the non-biomedical information of the user during a play section of the video data based on the generated log and the metadata.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Figure 1:
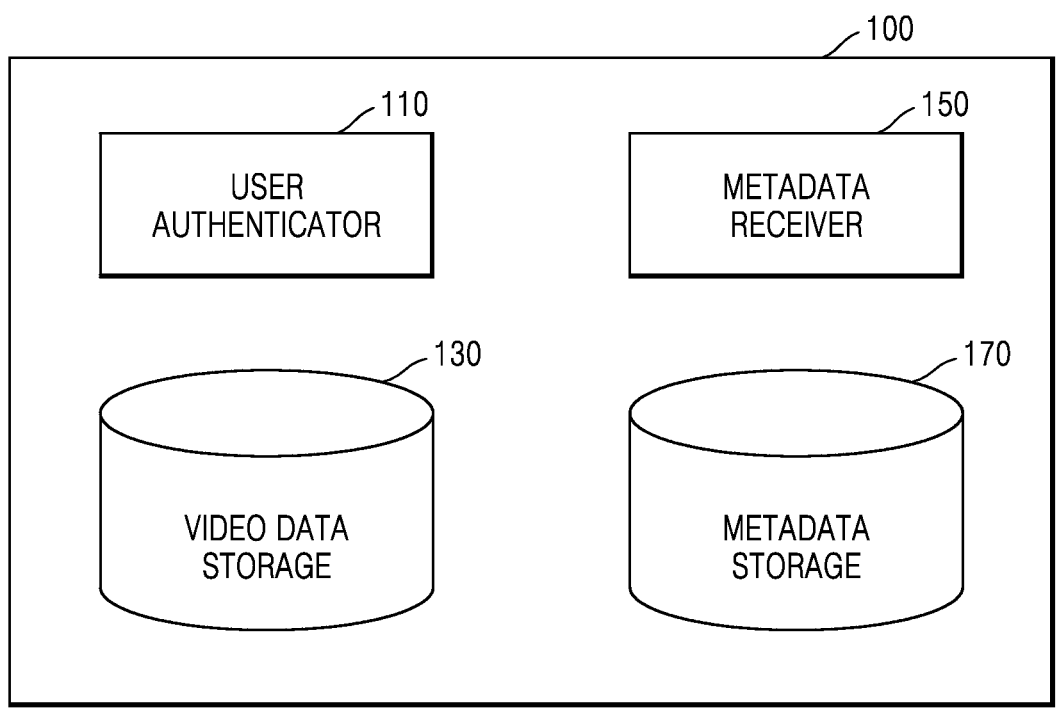
FIG. 1 is a block diagram of a video information system for providing video data access history according to an exemplary embodiment.

Hereinafter, exemplary embodiments will be described with reference to the accompanying drawings. It should be noted that like elements may be denoted by like reference numerals throughout the drawings.

In the following description, detailed descriptions of well-known functions or configurations will be omitted since they would unnecessarily obscure the subject matters of the inventive concept.

It will also be understood that the terms "comprises", "includes", and "has" used herein specify the presence of stated elements, but do not preclude the presence or addition of other elements, unless otherwise defined. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a video information system 100 for providing video data access history according to an exemplary embodiment.

The video information system for providing the video data access history, according to the exemplary embodiment, (hereinafter, referred to as an access history providing system 100) may include a user authenticator 110, a video data storage 130, a metadata receiver 150, and a metadata storage 170.

The user authenticator 110 receives an input of user information from a user, and performs authentication processes for determining whether the user inputting the user information is an authorized user who has a right to log in to the access history providing system 100 to perform various operations on video data.

The user information input by the user may include not only an identification (ID) and a password that are generally used but also general personal information that may be input as text. The user authenticator 110 stores authentication information in advance, so as to compare the authentication information with the user information input by the user who attempts to log in to the access history providing system 100 currently.

The general personal information that may be input as text may be set when the authorized user is initially given the ID and the password in order to log in to the access history providing system 100, and the authentication information may include all personal information that may be input as text as well as the ID and the password.

For example, when the user generates the ID and the password for validly logging in to the access history providing system 100, the user may keep information that may be easily input as text and possibly known to the user only, such as the birthday of the user, a favorite color, a hometown, height and weight, blood type, acquaintance's name, and/or the number of family members, in advance.

The user who later accesses the access history providing system 100 may log in to the access history providing system 100 only when the user who attempts to access the access history providing system 100 inputs the text that is identical with the personal information stored in advance in the access history providing system 100, as well as the valid ID and the password, to the access history providing system 100, whether or not the user is the user who originally generated the ID and the password or any other one who attempts to access the access history providing system 100 illegally.

The ID and the password may be referred to as fixed information as they are granted exclusively to the user by the access history providing system 100, and the various personal information that the user additionally inputs may be referred to as unfixed information because the personal information may be freely set by the user in advance in order for the user to access the access history providing system 100.

Here, the unfixed information that is additionally input, in addition to the fixed information, may be input by the user through one screen. The user authenticator 110 generates a plurality of combinations of inquiries and a plurality of pieces of unfixed information corresponding to the inquires, respectively. Each of the combinations of the inquiries includes at least one inquiry. The user authenticator selects one of the plurality of combinations of the inquiries randomly. The user authenticator 110 allows the user to input the fixed information and at least one piece of the unfixed information corresponding to a randomly selected combination of the inquiries through one screen, and thereby improving a security effect.

Figure 6A:
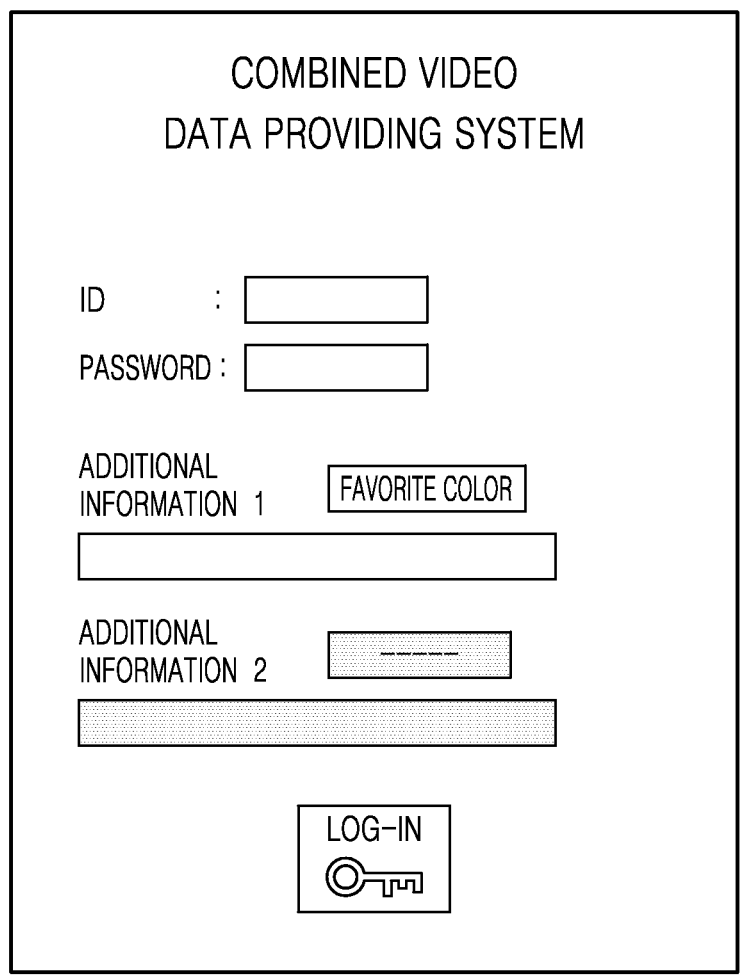
FIGS. 6A and 6B are diagrams showing examples of a log-in screen implemented by a user authenticator, according to exemplary embodiments.
Figure 6B:
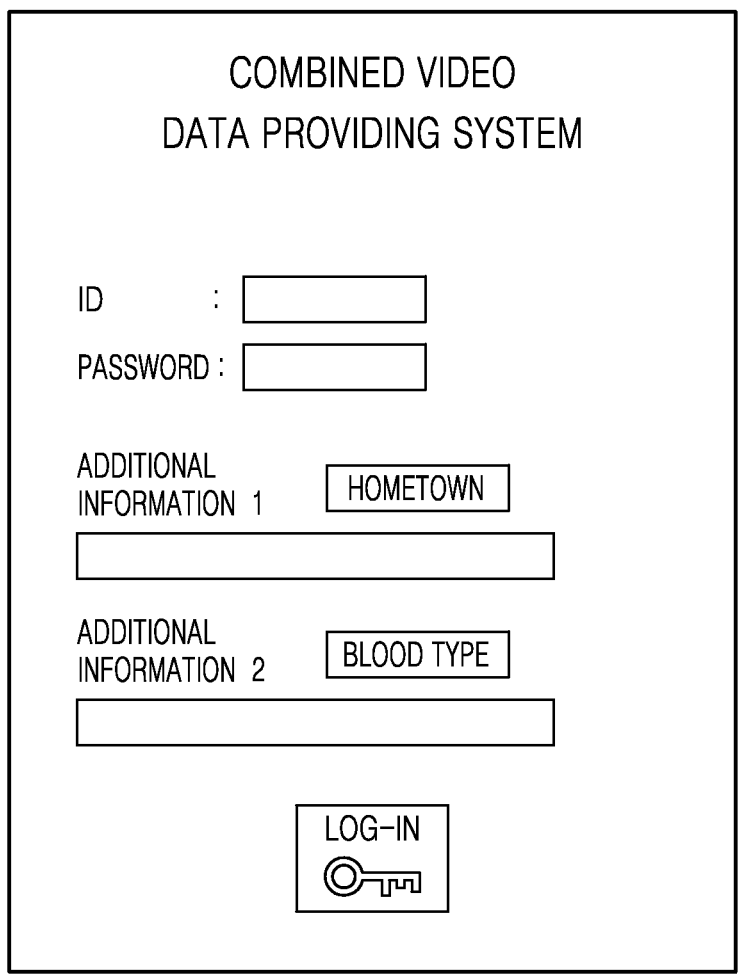

FIGS. 6A and 6B are diagrams illustrating examples of a log-in screen configured by the user authenticator 110.

The log-in screen of FIG. 6A includes a space into which the fixed information (ID and password) is input and a space, i.e., an inquiry, into which the unfixed information is input. The log-in screen of FIG. 6A requires to input a favorite color of the user as the unfixed information, and the user inputs the ID, the password, and the favorite color and clicks a log-in button by using an input device such as a mouse to log-in to the access history providing system 100.

Next, the log-in screen of FIG. 6B includes a space into which the fixed information is input and a space, i.e., an inquiry, into which the unfixed information is input. The log-in screen of FIG. 6B requires to input the hometown and blood type of the user as the unfixed information, and the user inputs the ID, the password, and the hometown and blood type of the user, and clicks a log-in button by using the input device such as a mouse to log-in to the access history providing system 100.

When comparing FIGS. 6A and 6B with each other, in FIG. 6A, the user authenticator 110 selects an inquiry corresponding to the 'favorite color of the user' as the combination of the inquiries, and in FIG. 6B, the user authenticator 110 selects inquiries corresponding to the 'hometown of the user' and the 'blood type of the user' as the combination of the inquiries. The combination selected by the user authenticator 110 varies every time when the user makes the log-in screen pop up in order to access the access history providing system 100. Therefore, even if the ID and the password are exposed to an unauthorized user via a Brute force attack that continuously replaces all countable combinations of characters, the possibility for the unauthorized user to fail logging in to the access history providing system 100 becomes extremely high.

As another example, in order to improve security of the video data stored in the access history providing system 100, the user authenticator 110 may perform authentication processes in multiple steps for receiving user information from the user.

For example, the user authenticator 110 of the access history providing system 100 outputs a screen for receiving a valid ID and a password as a primary authentication process. If the user passes the primary authentication by inputting the valid ID and the password to the access history providing system 100, the user authenticator 110 may output a secondary authentication screen for receiving the birthday, favorite color of the user, etc. only when the user passes the primary authentication.

Figure 6C:
FIGS. 6C and 6D are diagrams showing other examples of a log-in screen implemented by a user authenticator, according to exemplary embodiments.
Figure 6D:
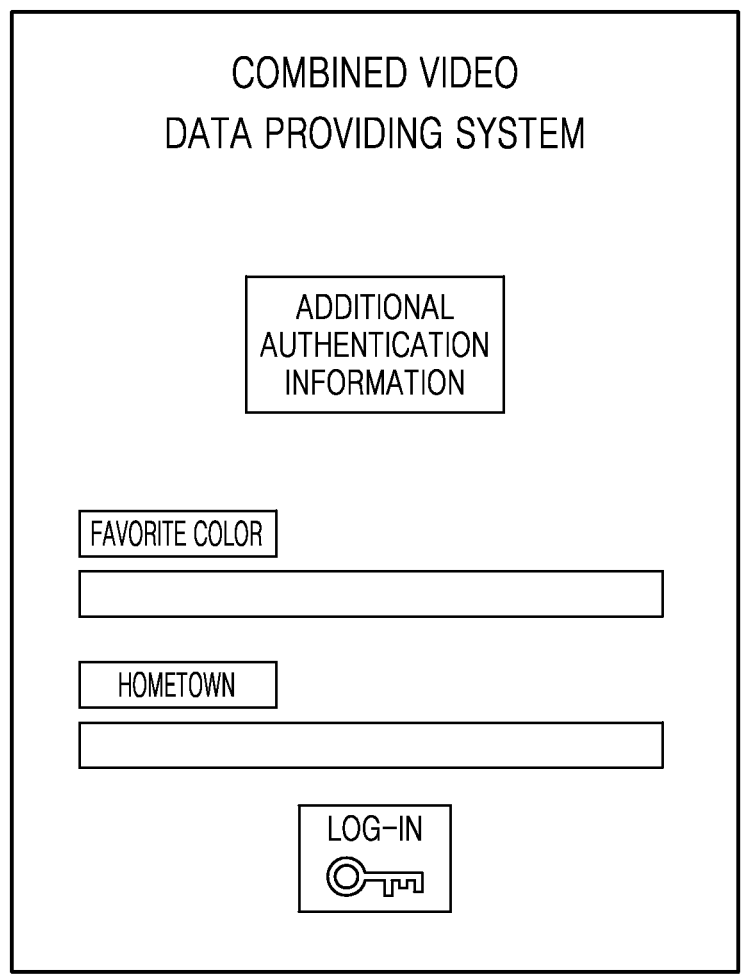

FIGS. 6C and 6D are diagrams illustrating other examples of the log-in screen configured by the user authenticator 110.

The log-in screen of FIG. 6C includes a space into which the fixed information (ID and password) is input. The log-in screen of FIG. 6C requires to input the ID and the password as the fixed information, and the user may input the ID and the password and clicks a log-in button by using the input device such as a mouse to pass the primary authentication.

Next, the log-in screen of FIG. 6D includes a space, i.e., an inquiry, into which the unfixed information is input. The log-in screen of FIG. 6D requires to input the favorite color of the user and hometown of the user as the unfixed information, and the user may input the favorite color and hometown of the user and clicks a log-in button by using the input device such as a mouse to pass the secondary authentication and log-in to the access history providing system 100.

When the access history providing system 100 performs the authentication processes in multiple steps, even if the ID and the password that are necessary to pass the primary authentication are exposed to an unauthorized user via the Brute force attack that continuously replaces all countable combinations of characters, and thus, the unauthorized user passes the primary authentication of the access history providing system 100, content and the number of kinds of information that has to be input in order to pass the secondary authentication may vary depending on the ID and the password used in the primary authentication, and accordingly, it is difficult for the unauthorized user to completely pass the authentication processes of the access history providing system 100.

From among the authentication information (fixed information and unfixed information) stored in the access history providing system 100, the general personal information input as text, except the ID and the password, may be a combination including at least one of the birthday of the user, favorite color of the user, hometown of the user, etc., and the number of kinds of personal information may be set by the initial user. That is, if the user designates the birthday of the user and the favorite color of the user, the combination of the inquiries output on the log-in screen may include one of an inquiry corresponding to the 'birthday of the user', an inquiry corresponding to the 'favorite color of the user', and an inquiry set corresponding to the 'birthday and favorite color of the user'.

The video data storage 130 may classify the video data accessed by the user who has passed the authentication processes provided by the user authenticator 110 according to a level of significance thereof, and store classified video data. A range of access to the video data by the user may include video data search, attribute information about video data (upload time, data amount, etc.), play of video data, backup of video data (download the video data to another medium or system), etc. When the user initially generates the ID and the password required to log in to the access history providing system 100, the user may set and restrict the allowable access range with respect to the video data for the user. In addition, a manager or administrator of the access history providing system 100 may set an allowable access range with respect to the video data stored or video data to be stored therein by user.

The level of significance of the video data is set when the authorized user uploads the video data to store the video data in the access history providing system 100, and may be changed later by a valid user who accesses the access history providing system 100.

The level of significance of the video data may be subjective to the user according to contents included in the video data, or may be determined at the same time when storing (uploading) the video data in the access history providing system 100 based on objective criteria such as an amount or a time duration of the video data, a time when the video data was captured, etc.

For example, video data having a capacity of 4 GB or greater may be classified as important video data, or video data stored between Oct. 1, 2014 to Oct. 20, 2014 may be classified as video data having high significance. The video data stored in the video data storage 130 may be classified as two kinds, that is, data having high significance and data having low significance. Otherwise, the significance may be classified in more detail, as described later when the metadata receiver 150 is described.

The metadata receiver 150 receives metadata including at least one of biomedical information and non-biomedical information that may authorize the user according to the level of significance of the video data that the user is about to access, when the user who has passed the authentication provided by the user authenticator 110 attempts to access the video data stored in the access history providing system 100.

Accessing the video data stored in the access history providing system 100 may include an operation of searching for video data by using a certain keyword, an operation of playing the video data, an operation of transmitting the video data to another medium or system, an operation of editing the video data stored in the access history providing system 100 (falsification of video data, deletion of video data, etc.), etc.

The biomedical information that can be used to authorize the user may include information such as fingerprints, a facial picture, an iris, voice, etc. of the user who is logging in to the access history providing system 100 after passing the authentication provided by the user authenticator 110.

Since such biomedical information above is exclusive information for each user, the metadata receiver 150 may request the user to input the biomedical information when the user attempts to access the video data having a high level of significance, and the metadata receiver 150 may include a fingerprint input unit (not shown), a camera (not shown), or a microphone (not shown) for receiving the input of the biomedical information.

The non-biomedical information that may authorize the user may include information such as the real name, e-mail address, credit card information, etc. of the user who is logging in to the access history providing system 100 after passing the authentication provided by the user authenticator 110.

Such non-biomedical information above may not correspond to each user in one-to-one correspondence and may be input as text by the user. In addition, the user may input arbitrary information that does not actually exist. However, if the access history providing system 100 configures a network with an external system or an external server, authenticity of the non-biomedical information may be determined rapidly, and processes of inputting the non-biomedical information may be simple when compared with the biomedical information.

The metadata receiver 150 may request the user to input the non-biomedical information when the user attempts to access the video data having a low level of significance, considering that the non-biomedical information of the user is less exclusive than the biomedical information.

When the access history providing system 100 sends an activation e-mail to an e-mail address input by the user so that the user receiving the activation e-mail may perform activation processes according to the activation e-mail, the metadata receiver 150 may handle the e-mail information of the user as the information that may be input when the user attempts to access the video data having a high level of significance, like the biomedical information, even though the e-mail address of the user is the non-biomedical information input as text.

The user has to input at least one of the biomedical information and the non-biomedical information in order to access the video data stored in the access history providing system 100. Whether the biomedical information or the non-biomedical information has to be input may be determined according to the significance of each video data classified and stored in the video data storage 130.

The biomedical information and the non-biomedical information that the user has to input via the metadata receiver 150 in order to access the video data stored in the access history providing system 100 according to the significance of the video data may be referred to as metadata of the video data that the user attempts to access.

The metadata storage 170 may store the biomedical or the non-biomedical information of the user input through the metadata receiver 150 to be linked as the metadata of the video data that the user attempts to access. Here, according to an exemplary embodiment, the metadata stored in the metadata storage 170 may include not only metadata of a user who has accessed the video data but also metadata of a user who has attempted to access the video data regardless of success of the accessing the video data for additional security purposes.

Since the metadata denotes attribute information that explains the video data, the biomedical information or the non-biomedical information of the user, input to the metadata receiver 150, is stored in the metadata storage 170 as information representing attributes of the video data to be accessed by the user.

For example, if the user inputs fingerprint information of the user to the metadata receiver 150 in order to play video data, e.g., 20141020.avi, the metadata storage 170 stores access history of the video data, that is, 20141020.avi, that has been played by the user who has input the fingerprint information to the metadata receiver 150. Here, contents of the access history stored in the metadata storage 170 may include an ID of the video data and/or a segment of the video data played, indication of an operation performed with respect to the video data, a play time period of the video data, information about the user including at least one of the fixed information, the non-fixed information, the biomedical information, and the non-biomedical information, etc. This access history may be stored as another metadata of the video data '20141020.avi'.

The metadata stored in the metadata storage 170 may let the authorized user know who has accessed the video data stored in the access history providing system 100 and when the video data stored in the access history providing system 10 was accessed, through a metadata displayer that will be described later with reference to FIG. 3.

Figure 2:
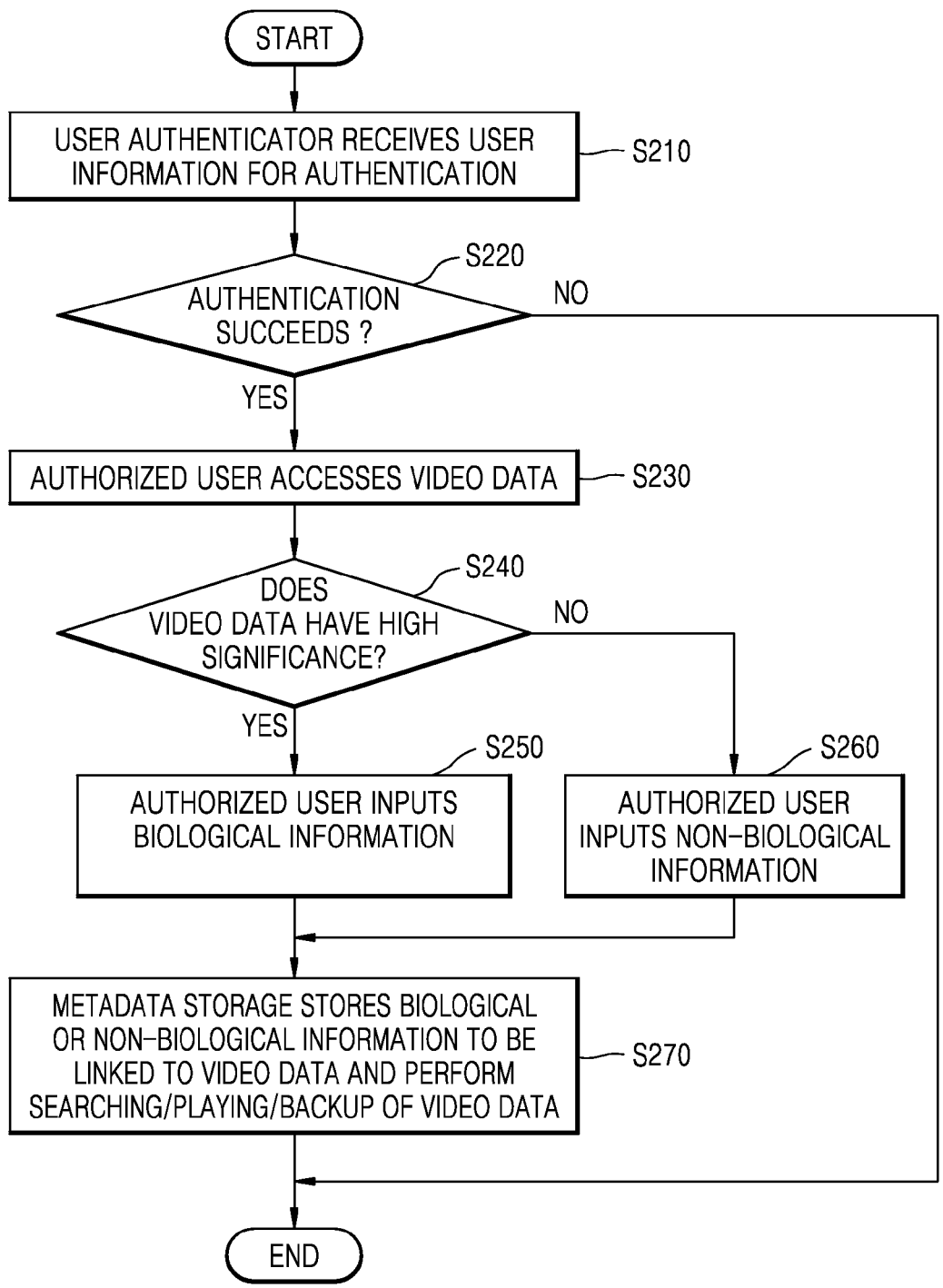
FIG. 2 is a flowchart illustrating a method of providing video data access history, in a video information system, according to an exemplary embodiment.

FIG. 2 is a flowchart illustrating a method of providing video data access history, in an access history providing system, according to an exemplary embodiment.

The flowchart of FIG. 2 will be described with reference to the block diagram of FIG. 1, and duplicate descriptions with those about the elements of FIG. 1 are omitted.

The user authenticator 110 receives an input of user information for authentication from the user who attempts to access the access history providing system 100 (S210).

The user information input to the user authenticator 110 by the user may include personal information such as the birthday of the user, a favorite color of the user, a hometown of the user, etc., in addition to generally used information such as an ID and a password.

The user authenticator 110 may primarily request the user to input an ID and a password and secondarily request the user to input a birthday and a hometown of the user, in order to reinforce the security of the user authentication processes.

The user authenticator 110 determines whether the user information input by the user is identical with authentication information stored in the user authenticator 110 in advance (S220).

If it is determined that the user information input by the user is identical with the authentication information stored in the user authenticator 110 in advance, the user authenticator 110 finishes the authentication processes of the user, and allows the user to log in to the access history providing system 100 so that the user may access the video data stored in the access history providing system 100 (S230).

The user who has logged in to the access history providing system 100 may access the video data, for example, the user may identify a list of video data stored in the access history providing system 100, and may identify the total amount of the video data. Accesses such as play of the video data, searching for the video data, etc. will be described in operation S270.

In addition, an allowable range for the user to access the video data stored in the access history providing system 100 may vary depending on the ID and the password input to the user authenticator 110.

Otherwise, if it is determined that the user information input by the user is not identical with the authentication information stored in the user authenticator 110 in advance, the user authenticator 110 does not allow the user to log in to the access history providing system 100. In addition, the user authenticator 110 may request the user to input the user information again, or may notify that an unauthorized user has accessed the access history providing system by outputting a warning message or an alarm, according to additional settings.

The metadata receiver 150 determines whether the video data that is searched for or requested to be played by the user has a high level of significance, when the user who has passed the authentication processes provided by the user authenticator 110 attempts to search for video data or to play video data stored in the access history providing system 100 (S240).

If it is determined that the video data that is searched for or requested to be played by the user has a high level of significance, the metadata receiver 150 requests the user to input biomedical information of the user via a fingerprint input unit, a camera, a microphone, etc. included in the metadata receiver 150, and accordingly, the user may input the biomedical information (S250).

The metadata receiver 150 sends an activation e-mail to an e-mail address input by the user. Then, when the user receiving the e-mail performs activation processes according to the e-mail, the e-mail address of the user may be used as information that is input when the user attempts to access the video data having high significance like the biomedical information, even though the e-mail address of the user is non-biomedical information input as text.

Otherwise, if it is determined that the video data that is searched for or requested to be played by the user has a low level of significance, the metadata receiver 150 may request the user to input non-biomedical information in a text format, such as a real name, an e-mail address, credit card information of the user, and accordingly, the user may input the non-biomedical information (S260).

The metadata storage 170 stores the biomedical information or the non-biomedical information input by the user in operation S250 or S260 as metadata of the video data that is searched for or requested to be played by the user before inputting the biomedical or non-biomedical information, and link the metadata with corresponding video data (S270).

The user may not access the video data (searching, playing, backing-up, etc.) until the biomedical information or the non-biomedical information is input to the metadata receiver 150 according to the significance of the video data.

The biomedical information or the non-biomedical information of the user stored in the metadata storage 170 is read by an authorized user such as a manager of the access history providing system 100 in order to determine whether the user accessing the video data is rightful or not.

Figure 3:
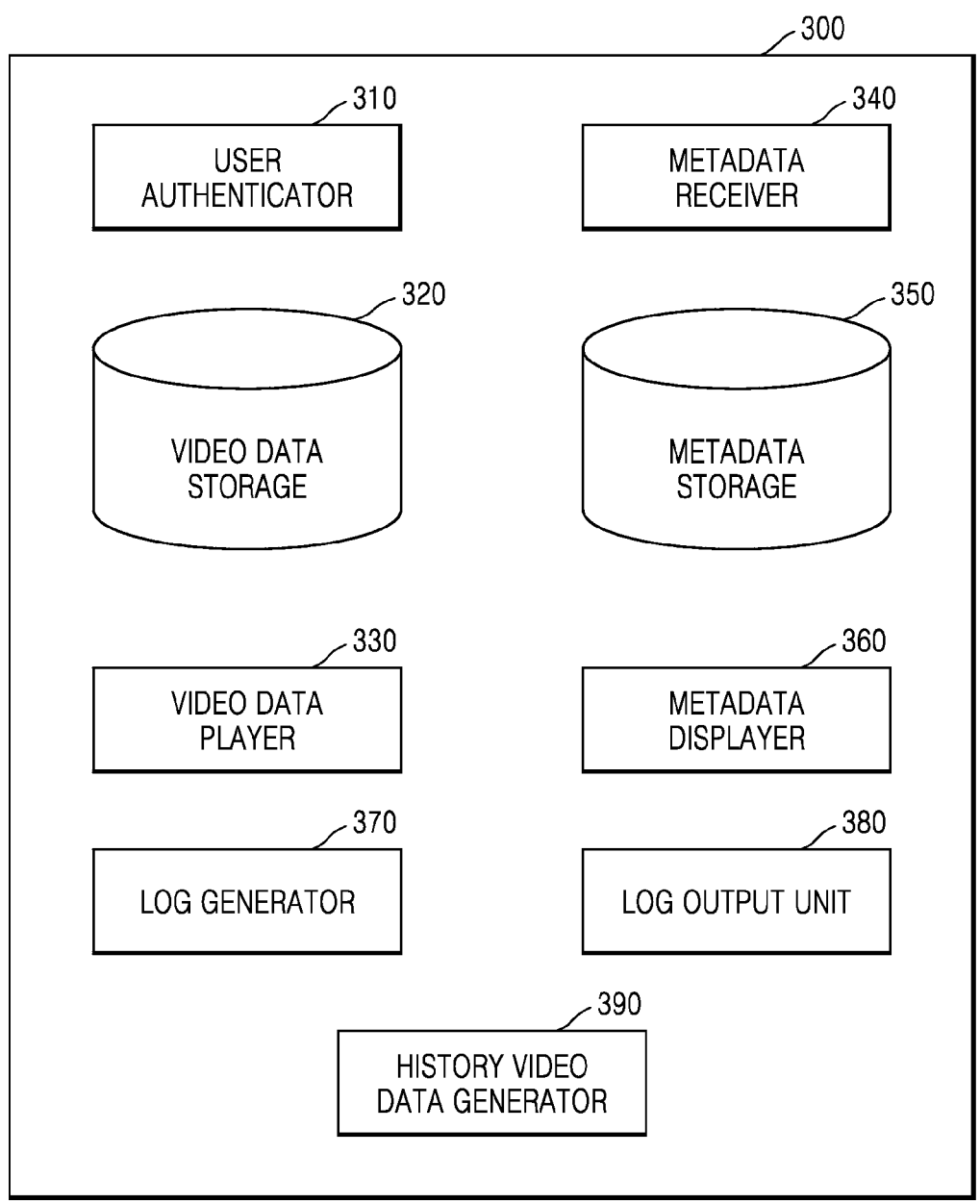
FIG. 3 is a block diagram of a video information system for providing video data access history, according to another exemplary embodiment.

FIG. 3 is a block diagram of an access history providing system 300 according to another exemplary embodiment.

Descriptions about like reference numerals as those of FIG. 1 are omitted for convenience of description.

The access history providing system 300 of FIG. 3 includes a user authenticator 310, a video data storage 320, a video data player 330, a metadata receiver 340, a metadata storage 350, a metadata displayer 360, a log generator 370, a log output unit 380, and a history video data generator 390.

The user authenticator 310 receives an input of user information from the user, and performs authentication processes for determining whether the user inputting the user information is a rightful or authorized user who may access the access history providing system 300 and perform various operations on the video data.

The user information input by the user may include general personal information that may be input as text, as well as an ID and a password that are generally used. The user authenticator 310 stores authentication information in advance so as to compare the authentication information with the user information input by the user who is attempting to access the access history providing system 300.

The video data storage 320 classifies video data according to significance of the video data, and stores classified video data. The user who has passed the authentication processes provided by the user authenticator 310 may access the video data. An allowable range of accessing the video data for the user may include searching of video data, playing of video data, back-up of video data (download video data to another medium or another system), etc., and the user may set the allowable range of accessing the video data when generating the ID and the password initially in order to access the access history providing system 300. In addition, the access history providing system 300 may be configured to allow a manager or administrator of the access history providing system 300 or the user who uploads the video data to set an allowable range of accessing the video data stored or video data to be stored therein by user and/or by segment of the video data. Further, the access history providing system 300 may be configured to allow the manager or administrator to set different accessibilities to a plurality of sets of video data.

The video data player 330 plays the video data stored in the video data storage 320. In addition, the video data player 330 may operate in communication with the metadata displayer 360 displaying metadata stored in the metadata storage 350 with the video data, and this will be described in detail later when the metadata displayer 360 is described.

The metadata receiver 340 may receive an input of metadata including at least one of biomedical information and non-biomedical information that may authorize the user according to significance of the video data that the user wants to access, when the user who has passed though the authentication processes provided by the user authenticator 310 attempts to access the video data stored in the access history providing system 300.

The biomedical information that may authorize the user may include information such as fingerprints, a facial picture, an iris, voice, etc. of the user who is currently accessing the access history providing system 300 after passing the authentication processes, and the non-biomedical information that may authorize the user may include information such as the real name, driver license number, passport number, existing e-mail address, credit card information, etc. of the user who is currently logging in to the access history providing system 300 after passing the authentication processes.

The metadata receiver 340 may include a fingerprint input unit (not shown), a camera (not shown), and a microphone (not shown) for receiving an input of the biomedical information from the user.

The metadata storage 350 may store the biomedical information or the non-biomedical information of the user input to the metadata receiver 340 to be linked to the video data that the user attempts to access, as metadata of the video data.

The metadata denotes attribute information for explaining data. Thus, the biomedical information or non-biomedical information input to the metadata receiver 150 may be stored in the metadata storage 350 as information representing attribute of the video data that the user attempts to access.

The metadata displayer 360 reads the metadata stored in the metadata storage 350 to display the metadata to the user who attempts to access certain video data.

In order to store the metadata in the metadata storage 350, the number of times that a user accesses the access history providing system 300 and attempts to access the video data has to be at least one. Hereinafter, for convenience of description, a 'first user' refers to a user who has previously accessed the video data stored in the access history providing system 300, and then left the metadata in the metadata storage 350, and a 'second user' or 'next user' refers to a user who logs in to the access history providing system 300 after the 'first user' has logged out from the access history providing system 300.

In particular, when the second user accesses the video data that has been accessed by the first user, the metadata displayer 360 displays the metadata that is input by the first user in order to access the video data, while the video data is accessed (searching, playing, backup, etc.).

For example, when it is assumed that the first user inputs a facial picture that is one piece of biomedical information to the access history providing system in order to play video data, e.g., 'A.mpeg', that has a high level of significance, the facial picture of the first user is stored as metadata of the video data 'A.mpeg'. Thus, when the second user plays the video data 'A.mpeg', the metadata displayer 360 may display the facial picture of the first user with the video data 'A.mpeg' played by the second user, as a result of the metadata stored to be linked with the video data 'A.mpeg.' Also, the metadata displayer 360 may display other metadata, as discussed earlier, which was stored as a result of the first user's access of the video data 'A.mpeg.'

Here, the metadata such as the facial picture of the first user may be output in a smaller screen than a screen outputting the video data 'A.mpeg' that is currently played, that is, in a picture-in-picture (PIP) format.

As another example, when it is assumed that the first user inputs the real name of the first user, that is, a piece of the non-biomedical information, in order to play video data having a low level of significance, the metadata displayer 360 may display the real name of the first user as a caption or subtitle over the video data that is currently being played by the video data player 330 when the second user plays the video data having the low level of significance and played by the first user.

When the number of first users is two or more, the metadata displayer 360 may display metadata about the first user who has logged in to the access history providing system 300 to access corresponding video data most recently from among the plurality of first users, or may display metadata about all of the first users who accessed the corresponding video data before the second user accesses the access history providing system 300.

In addition, the second user who validly logs in to the access history providing system 300 may set the metadata to be displayed only by a request from the second user, if there is no need to identify who has accessed the video data previously when playing the video data.

The log generator 370 generates a log in which a list of video data that is accessed by the user who has passed the authentication processes provided by the user authenticator 310 is recorded.

The log generated by the log generator 370 records accessing of the user who has passed the authentication processes provided by the user authenticator 310 in a time-serial manner.

Contents recorded in the log may include information about an ID (e.g., file name) of the video data that the user accesses, the biomedical or non-biomedical information input by the user for accessing the video data, a kind of the access of the user to the video data (searching, playing, backup, editing, etc.), and a log-in and/or log-out time from the access history providing system 300.

A time point when the log generator 370 starts to record the log is right after the user has logged in to the access history providing system 300 by inputting to the access history providing system 300 user information that is identical with the ID, the password, and the authentication information stored in the user authenticator 310. In addition, a time point when the log generator 370 stops recording the log may be a time when the user logs out from the access history providing system 300. However, setting of the start point and the stop point of the log recording may be changed by an authorized user or administrator of the access history providing system 300 utilizing the information recorded in the log.

The log output unit 380 outputs the log generated by the log generator 370 to the second user who logs in to the access history providing system 300 by inputting valid user information to the access history providing system 300, automatically or according to a request from the second user.

The second user may identify the contents recorded in the log that is automatically output as a pop-up window or a push alarm on logging in to the access history providing system 300, or may identify by inputting an additional request to the access history providing system 300. Therefore, the second user may identify the operations performed by the first user in the access history providing system 300, and may determine rapidly whether the first user is an authorized user who is allowed to log in to the access history providing system 300 by identifying the metadata mapped with the video data that is the access target.

The biomedical information or the non-biomedical information of the first user stored in the metadata storage 350 is different from the log generated by the log generator 370 and output by the log output unit 380 in that the biomedical information or the non-biomedical information of the first user is the information by which identity of the first user who has accessed the video data may be recognized when the video data that has been accessed by the first user is defined. In contrast, the log, in which the various operations performed by the first user after the first user logs in to the access history providing system 300 are recorded, may be used to identify which video data has been mainly accessed by the first user.

The metadata displayer 360 reads the contents recorded in the log generated by the log generator 370 so as to use the log as the metadata of the video data or a section of the video data played by the first user, and accordingly, a section in which the metadata is displayed may be reduced or increased.

For example, it is assumed that the metadata displayer 360 operates in connection with the log generated by the log generator 370 as described above. That is, it is assumed that the first user inputs the facial picture of the first user as biomedical information to play a section from ninth minute to tenth minutes in video data 'K.mkv' having a high level of significance and then logs out from the access history providing system 300. After that, the second user starts to play the video data 'K.mkv' from the beginning, and then, the facial picture of the first user is displayed with the video data in a PIP format nine minutes after the play of the video data has started and disappears once ten minutes has passed.

That is, when a section of the video data that has been played by the first user is played, the metadata displayer 360 displays at least one of the biomedical information and the non-biomedical information of the first user during the section of the video data, which has been played by the first user, based on the log generated by the log generator 370 and the metadata corresponding to the video data. As described above, the second user may identify the play of the video data, and at the same time, may identify the information about the first user who has played the video data as well.

In the above case, the second user may additionally obtain information about a certain part that the first user is interested in the video data that has been accessed by the first user.

The history video data generator 390 reads out a time point when the first user starts to play the video data, a time point when the first user stops playing the video data, and a play section of the video data based on the contents of the log, and generates history video data of the video data that has been played by the first user.

For example, when the first user plays a section from the fifth minute to the seventh minute of the video data 'K.mkv' and the play history is recorded in the log, the history video data generator 390 may generate history video data 'K_1.mkv' based on the contents of the log. The history video data 'K_1.mkv' is two-minute-long video data that is generated by editing the section from the fifth minute to the seventh minute from the entire video of the video data 'K.mkv', and the second user may determine that the first user has played the video data 'K.mkv' only by identifying the existence of the history video data.

The history video data generator 390 may include a program for editing the video data, and an algorithm capable of recognizing the time point when the play of the video data starts, the time point when the play of the video data stops, and the play section of the video data from an operation history of the first user recorded in the log. The history video data generated by the history video data generator 390 is stored in the video data storage 320.

According to an exemplary embodiment, the history video data generator 390 may generate history video data, so that one of the biomedical information and the non-biomedical information of the first user may be displayed during the entire play of the history video data by the second user, according to the significance of the original video data.

According to an exemplary embodiment, the metadata corresponding to the video data may include information about whether there is history video data or not. In the above example, when the second user plays the video data that has been played by the first user, the metadata displayer 360 may display a fact that there is history video data of the first user with respect to the video data, as the metadata of the video data.

Figure 4:
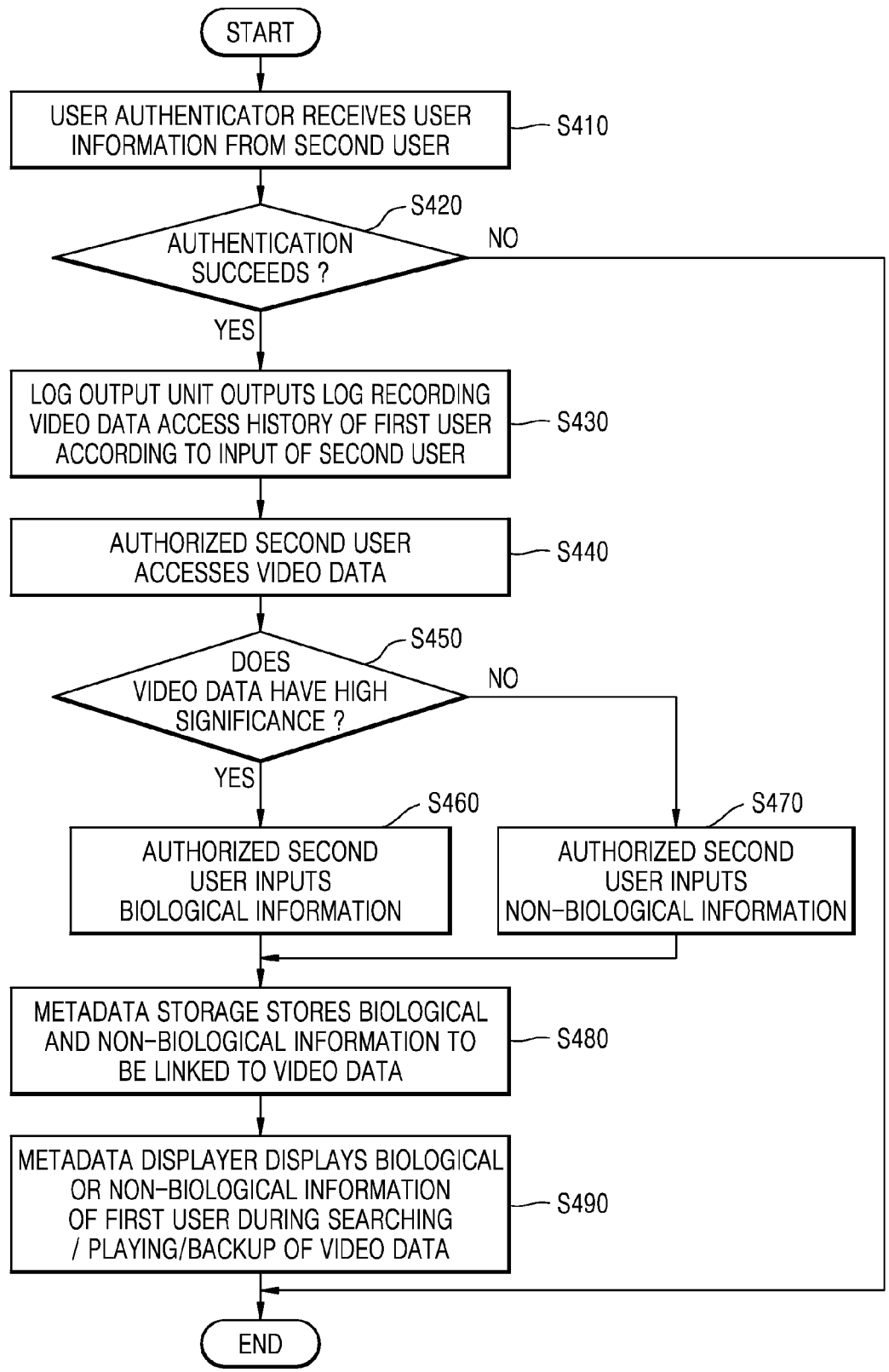
FIG. 4 is a flowchart illustrating a method of providing video data access history, in a video information system according to another exemplary embodiment.

FIG. 4 is a flowchart illustrating a method of providing video data access history in the access history providing system 300, according to another exemplary embodiment.

The flowchart of FIG. 4 will be described with reference to the configuration of the access history providing system 300 of FIG. 3, and descriptions about the like elements as those of FIG. 2 will be omitted for convenience of description.

The user authenticator 310 receives an input of user information for authentication from the second user who tries to log-in to the access history providing system 300 (S410).

The user authenticator 310 determines whether the second user is authorized to log in to the access history providing system 300 by comparing an ID, a password, and personal information included in the user information input by the second user with authentication information stored in the user authenticator 310 in advance (S420).

If it is determined that the user information input by the second user is identical with the authentication information stored in the user authenticator 310 in advance, the user authenticator 310 finishes the authentication processes of the second user. In addition, the access history providing system 300 allows the second user to log in to the access history providing system 300 so that the second user may access the video data stored in the access history providing system 300 (S430).

Also, in operation S430, the log generator 370 starts to record the second user's operation of access to the video data stored in the access history providing system 300 from when the second user logs-in to the access history providing system 300, and the log output unit 380 may output a log in which the access operation of the first user to the access history providing system 300 to access the video data before the second user logs in to the access history providing system 300, automatically according to a setting of the log output unit 380 or according to a request of the second user.

If it is determined that the user information input by the second user is not identical with the authentication information stored in the user authenticator 310 in advance, the user authenticator 310 does not allow the second user to access the access history providing system 300. Then, the user authenticator 310 may further request the user information of the second user or may output a warning message or an alarm notifying that an unauthorized user has accessed the access history providing system 300.

After logging in to the access history providing system 300, the log including the access operation of the first user is output automatically or according to the request of the second user, and after that, the second user may input the biomedical information or the non-biomedical information of the second user in order to access the video data stored in the access history providing system 300 (S440).

The access to the video data in operation S440 may denote access to the video data in a narrow sense, that is, that there is no further process of determining whether the second user is an authorized user since the authorization processes of the second user are finished, and a low level of access, such as identification of a list of video data stored in the access history providing system 300, identification of an entire amount of the video data, etc., may be allowable. The access to the video data in a broad sense will be described later in operation S490.

When the second user who has passed the authentication processes provided by the user authenticator 310 attempts to search for the video data or play the video data stored in the access history providing system 300, the metadata receiver 340 determines whether the video data that is to be searched for or played by the second user has a high level of significance before performing the operation requested by the second user (S450).

The level of significance of the video data is set when an authorized user such as an administrator upload the video data and store the video data in the access history providing system 300, and may be changed by a rightful user who logs in to the access history providing system 300 later. That is, the significance of the video data may be subjective to the user according to contents included in the video data, or may be determined at the same time of storing the video data in the access history providing system 300 according to objective criteria such as an amount or a time duration of the video data, a time when the video data was captured, etc.

The video data storage 320 classifies and stores the video data according to the significance of the video data that is determined subjectively by the user or according to the objective criteria set in the access history providing system 300.

If the video data that is to be searched for or played by the second user has a high level of significance, the metadata receiver 340 requests the second user to input biomedical information of the second user via a fingerprint input unit, a camera, a microphone, etc. included in the metadata receiver 340, and then, the second user may input the biomedical information (S460).

If the video data that is to be searched for or played by the second user has a low level of significance, the metadata receiver 340 requests the second user to input non-biomedical information in a text format, such as a real name, an e-mail address, credit card information of the second user, and then, the second user may input the non-biomedical information (S470).

The metadata storage 350 stores the biomedical information or the non-biomedical information input by the second user in operation S460 or S470 as metadata of the video data that is to be searched for or played by the second user before inputting the biomedical or non-biomedical information to the access history providing system 300, and link the metadata with the video data (S480).

The second user may access the video data only after the biomedical information or the non-biomedical information of the second user is input to the metadata receiver 340 according to the significance of the video data to be accessed (S490).

In operation S490, the access to the video data is in a broader sense than the access to the video data in operation S440, that is, may include an operation of searching for the video data by using a certain keyword and reading attribute information, an operation of playing the video data, an operation of copying the video data to another medium or system, etc. Here, the allowable range of accessing the video data stored in the access history providing system 300 for the second user may vary depending on the ID and the password input to the user authenticator 310.

The metadata displayer 360 receives the metadata of the video data that has been accessed by the first user, the metadata being stored in the metadata storage 350, and displays the metadata for the second user who is about to access the video data. The method of displaying the metadata may vary according to the significance of the video data that the second user is about to access.

If the video data that the second user is about to access has a high level of significance, the metadata is the biomedical information of the first user, and the metadata may be displayed with the video data that is accessed by the second user in the PIP format.

For example, when the second user searches for the video data of the high level of significance by inputting a certain keyword to the access history providing system 300 in order to read attribute information such as an amount of the video data, an upload time of the video data, etc., the metadata displayer 360 may display the fingerprint or the facial picture of the first user in a smaller window at a lower right portion of a screen or may pop-up a sound player to output voice of the first user input by the first user via the microphone of the metadata receiver 340, as the biomedical information of the first user sequentially or at the same time of outputting the attribute information of the video data on the screen.

As another example, when the second user plays video data having a low level of significance, the video data player 330 plays the video data, and the metadata displayer 360 may output the non-biomedical information of the first user (real name, e-mail address, credit card number, etc.) as a caption over the video data that is currently being played.

The second user who validly logs in to the access history providing system 300 may set the metadata to be displayed only according to a request of the second user in advance, if there is no need to identify who has accessed the video data previously when playing the video data.

According to an exemplary embodiment, when the second user plays the video data and logs out from the access history providing system 300 in operation S490, the history video data generator 390 may generate history video data of the video data played by the second user based on the log about the second user.

Figure 5:
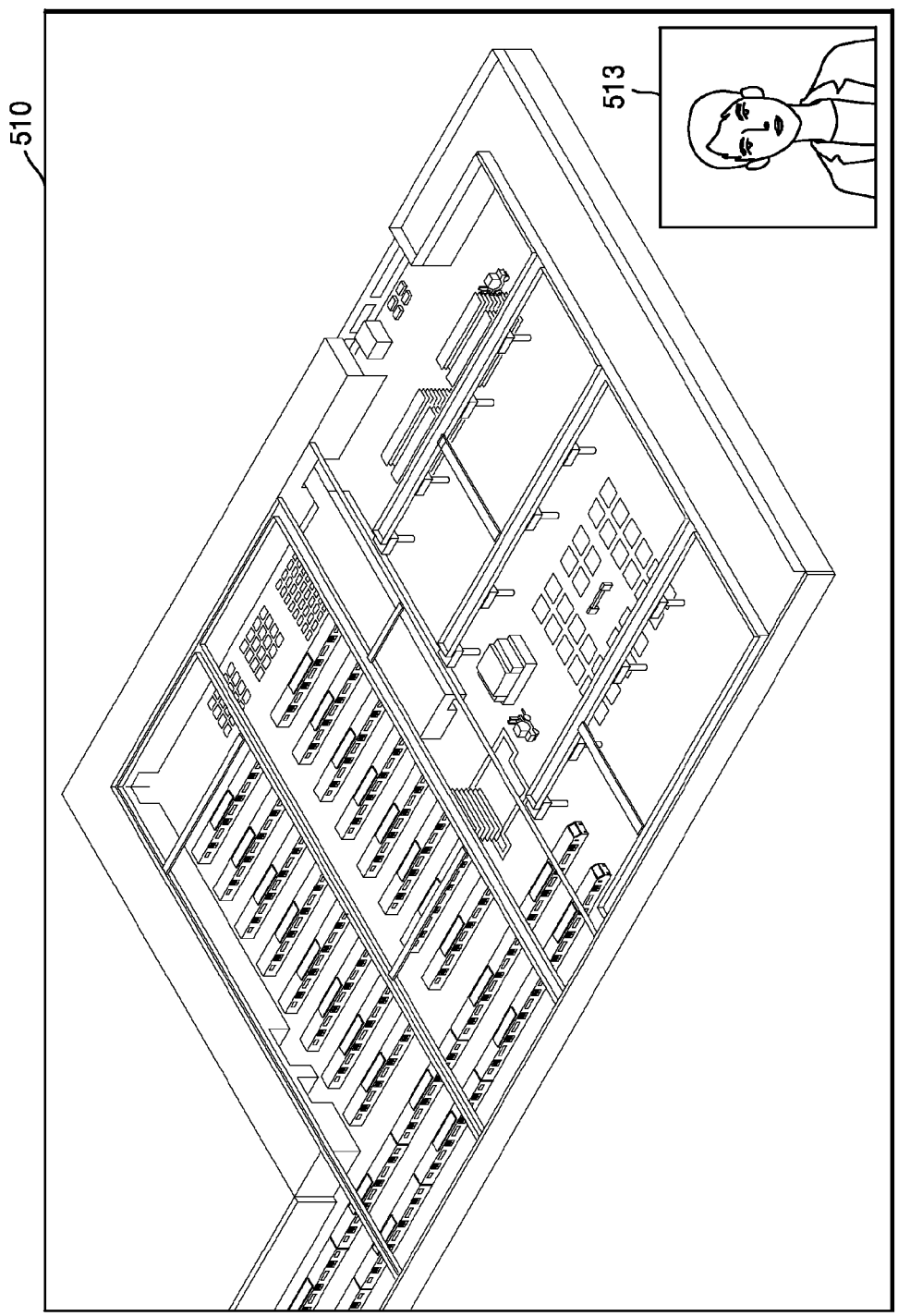
FIG. 5 is a diagram exemplarily showing a screen output to a second user when the system for providing the access history of FIG. 3 is implemented.

FIG. 5 is a diagram illustrating an example of a screen output to the second user when the access history providing system 300 of FIG. 3 is implemented.

The example of FIG. 5 will be described with reference to the block diagram of FIG. 3.

The example illustrated in FIG. 5 includes a first screen 510 outputting video about a subway car maintenance facility, and a second screen 513 displaying a facial picture of a first user input by the first user via the metadata receiver 340.

It is assumed that the first user logs in to the access history providing system 300 to play video data about inside the subway car maintenance facility, and the video data about inside the subway car maintenance facility is classified as video data having a high level of significance in the video data storage 320.

When a second user logs in to the access history providing system 300 and inputs biomedical information, and requests play of the video data about inside the subway car maintenance facility, the video data player 330 plays the video data as shown in the first screen 510, and the metadata displayer 360 displays the second screen 513 sequentially after or at the same time of playing the video data by the video data player 330.

The second screen 513 is output as a smaller screen included in the first screen 510 in the PIP format, and a size of the second screen may be changed by the second user.

The second user may not only play the video data about inside the subway car maintenance facility, which is requested to be played in the access history providing system 300, via the first screen 510, but may also identify the facial picture of the first user who has played the video data about inside the subway car maintenance facility previously via the second screen 513.

Here, the first user and the second user may be the same person or two different persons. In addition, since there may be a plurality of persons who have authority to log in to the access history providing system 300, one of the first user and the second user may not be necessarily an unauthorized user even when the first user and the second user are different persons.

According to the video information system for providing the video data access history and the method of providing the video data access history of the exemplary embodiments, a user accessing the video information system may identify a previous user who illegally accessed the video data in the video information system, and thus, the unauthorized user may be rapidly found. In addition, an identity of the unauthorized user may be recognized by using biomedical information and non-biomedical information of the unauthorized user stored in the video information system, and accordingly, fine for using the video information system without authority may be charged.

In addition, according to the exemplary embodiments, video data is classified according to significance thereof, and biomedical information of a user is required when the user accesses the video data having a high level of significance. Since an unauthorized user is not likely to cooperatively input the biomedical information in the video information system, the unauthorized user may give up on accessing the video data having the high level of significance even if the unauthorized user has passed the authentication processes and logged in to the video information system.

The operations or steps of the methods or algorithms described above can also be embodied as computer readable codes on a computer readable recording medium. The computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributive manner. Also, functional programs, codes, and code segments for accomplishing the inventive concept can be easily construed by programmers skilled in the art to which the inventive concept pertains.

At least one of the components, elements, modules or units represented by a block as illustrated in FIGS. 1 and 3, for example, the user authenticators 110 and 310, the log generator 370 and the history video data generator 390, may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the exemplary embodiments have been described with reference to the figures, it will be understood by those of ordinary skill in the art that various changes in form and details may be made therein without departing from the spirit and scope of the inventive concept as defined by the following claims.

What is claimed is:

1. A video information system for providing video data access history, the video information system comprising:
at least one memory configured to store at least one computer executable instruction; and at least one processor configured to execute the computer executable instruction to implement at least one module comprising:
a metadata receiver requesting a user, who is attempting to access video data stored in a video data storage, to input metadata comprising at least one of biomedical information and non-biomedical information of the user, according to a level of significance of the video data set based on an attribute of the video data, receiving the metadata input by the user, and storing the received metadata with a link to the video data in a metadata storage,
wherein the at least one module further comprises a user authenticator requesting the user to input at least a portion of user information to log in the video information system before the metadata receiver requests the user to input the metadata,
wherein the user information comprises fixed information comprising an identification (ID) and a password of the user, and a plurality of pieces of unfixed information set by the user in advance,
wherein the at least a portion of the user information comprises the fixed information and at least one of the plurality of pieces of the unfixed information,
wherein the user authenticator generates a plurality of combinations of inquiries corresponding to the plurality of pieces of the unfixed information, respectively, each combination of the inquiries comprising at least one inquiry, and
wherein, when the user attempts to log in the video information system, the user authenticator requests the user to input the at least one of the plurality of pieces of the unfixed information in response to at least one of the plurality of combinations of the inquiries which the user authenticator randomly selects from the plurality of combinations of the inquiries.

2. The video information system of claim 1, further comprising a metadata displayer configured to display the metadata with the video data, in response to a next user accessing the video data,
wherein the metadata displayer is configured to display the metadata only when a section of the video data that has been accessed by the user is played, and not to display the metadata when the remaining section of the video data that has not been accessed by the user is displayed.

3. The video information system of claim 1, further comprising a metadata displayer configured to display the metadata with the video data, in response to a next user accessing the video data,
wherein, if there are a plurality of users who have accessed the video data, the metadata displayer displays one or more pieces of metadata stored by the plurality of users according to a setting of the next user.

4. The video information system of claim 1, further comprising a metadata displayer configured to display the metadata with the video data, in response to a next user accessing the video data,
wherein, if the next user plays one piece of the video data that has been accessed by the user, the metadata displayer displays the metadata in a picture-in-picture (PIP) format on a screen playing the video data.

5. The video information system of claim 1, further comprising a metadata displayer configured to display the metadata with the video data, in response to a next user accessing the video data,
wherein the at least one module further comprises:
a log generator generating a log in which a list of video data that has been accessed by the user is recorded; and
a log output unit outputting the log to the next user.

6. The video information system of claim 5, wherein, when the next user plays one piece of the video data that has been played by the user, the metadata displayer displays one of the biomedical information and the non-biomedical information of the user during a play section of the video data based on the generated log and the metadata.

7. A method of providing video data access history using at least one processor, the method comprising:
controlling the processor to request a user, who is attempting to access video data stored in a video data storage, to input metadata comprising at least one of biomedical information and non-biomedical information of the user, according to a level of significance of the video data set based on an attribute of the video data;
controlling the processor to receive the metadata input by the user;
controlling the processor to store the received metadata with a link to the video data in a metadata storage;
controlling the processor to request the user to input at least a portion of user information to log in the video information system, before the user is requested to input the metadata,
wherein the user information comprises fixed information comprising an identification (ID) and a password of the user, and a plurality of pieces of unfixed information set by the user in advance, and
wherein the at least a portion of the user information comprises the fixed information and at least one of the plurality of pieces of unfixed information;
controlling the processor to generate a plurality of combinations of inquiries corresponding to the plurality of pieces of the unfixed information, respectively, each combination of the inquiries comprising at least one inquiry; and
controlling the processor, when the user attempts to log in the video information system, to request the user to input the at least one of the plurality of pieces of the unfixed information in response to at least one of the plurality of combinations of the inquiries that the user authenticator randomly selects from the plurality of combinations of the inquiries.

8. The method of claim 7, further comprising controlling the processor to display the metadata with the video data, in response to a next user accessing the video data,
wherein the displaying the metadata comprises displaying the metadata only when a section of the video data that has been accessed by the user is played, and not displaying the metadata when the remaining section of the video data that has not been accessed by the user is displayed.

9. The method of claim 7, further comprising controlling the processor to display the metadata with the video data, in response to a next user accessing the video data,
wherein, if there are a plurality of users who have accessed the video data, the displaying the metadata comprises displaying one or more pieces of metadata stored by the plurality of users according to a setting of the next user.

10. The method of claim 7, further comprising controlling the processor to display the metadata with the video data, in response to a next user accessing the video data,
wherein the displaying the metadata comprises, if the next user plays one piece of the video data that has been accessed by the user, displaying the metadata in a picture-in-picture (PIP) format on a screen playing the video data.

11. The method of claim 7, further comprising:
controlling the processor to display the metadata with the video data, in response to a next user accessing the video data;
generating a log in which a list of video data that has been accessed by the user; and
outputting the log to the next user.

12. The method of claim 11, wherein the displaying the metadata comprises, when the next user plays one piece of the video data that has been played by the user, displaying one of the biomedical information and the non-biomedical information of the user during a play section of the video data based on the generated log and the metadata.

* * * * *